United States Patent [19]

Tsumura et al.

[11] Patent Number: 4,729,660

[45] Date of Patent: Mar. 8, 1988

[54] POSITION MEASURING APPARATUS OF MOVING VEHICLE

[76] Inventors: Toshihiro Tsumura, 7-21 Abiko 3-chome, Sumiyoshi-ku, Osaka-shi, Osaka-fu, Japan, 558; Takeshi Tsumura, 8-80 Sumiyoshi 5-chome, Tokushima-shi, Tokushima-ken, Japan, 770

[21] Appl. No.: 841,896

[22] Filed: Mar. 20, 1986

[30] Foreign Application Priority Data

Mar. 22, 1985 [JP] Japan .................................. 60-59014
May 4, 1985 [JP] Japan .................................. 60-95851

[51] Int. Cl.$^4$ .............................................. G01B 11/14
[52] U.S. Cl. ...................................... 356/375; 180/109; 364/424; 356/152
[58] Field of Search .......................... 356/1, 375, 152; 180/167, 169; 364/424, 456, 449; 901/47

[56] References Cited

U.S. PATENT DOCUMENTS 4,049,961 9/1977 Marcy .................................. 180/169
4,225,226 9/1980 Davidson et al. ................... 364/456
4,309,758 1/1982 Halsall et al. ....................... 364/424

Primary Examiner—R. A Rosenberger
Assistant Examiner—Crystal D. Cooper
Attorney, Agent, or Firm—Darby & Darby

[57] ABSTRACT

Light reflecting means 2R and 2L provided on both sides of a road 1 each reflect an incident light at the same angle as the angle of incidence with respect to the plane of incidence. Lights 8R and 8L emitted from a moving vehicle 3 are reflected from the light reflecting means 2R and 2L and returned again to the light emitting source and accordingly they are detected by light receivers 75R and 75L. The position of the moving vehicle 3 is calculated geometrically based on the moving distance of the moving vehicle 3 in a period obtained from the difference between the light receiving time of the light receiver 75R and that of the light receiver 75L or the light receiving angle as well as the moving direction of the moving vehicle 3 and the positions where the light reflecting means 2R and 2L are installed.

12 Claims, 17 Drawing Figures

POSITION MEASURING APPARATUS OF MOVING VEHICLE

BACKGROUND OF THE INVENTION

1. Field of the Invention

The present invention relates to a position measuring apparatus of a moving vehicle and particularly to an apparatus for measuring the present position of a moving vehicle utilizing reflection of light.

2. Description of the Prior Art

As the prior art, an apparatus for measuring the present position of a moving vehicle such as a car, unmanned carrier in a factory or the like is known for example in the form of an apparatus in which a moving vehicle receives the radio wave transmitted from radio wave transmitting stations installed at a plurality of locations on the ground so that the present position of the moving vehicle is calculated based on the receiving direction and other data.

Such a position measuring apparatus using a radio wave requires a plurality of transmitters, which involves a disadvantage that the manufacturing cost becomes high. Another disadvantage is that frequent inspection or maintenance is required in order to always assure normal operation of such transmitters. Particularly if the transmitters are used in the open air, the environmental conditions of the transmitters become severe and accordingly inspection or maintenance thereof will be required with excessively high frequency. In addition, since such a position measuring apparatus as described above uses a radio wave, another problem is involved that the apparatus needs to comply with the regulations of the Electric Wave Law or it is exposed to the influence of radio noise.

SUMMARY OF THE INVENTION

Therefore, an object of the present invention is to provide a position measuring apparatus of a moving vehicle, which can be structured simply and at low cost and can be operated with little necessity of inspection or maintenance and is not subjected to any regulations of the Electric Wave Law.

Briefly stated, an apparatus for measuring a position of a moving vehicle in accordance with the present invention comprises, in association with the moving course of the moving vehicle, light reflecting means having an optical characteristic for reflecting light at the same angle as the angle of incidence with respect to the plane of incidence so that lights emitted from the moving vehicle toward those light reflecting means are reflected by those light reflecting means and the reflected lights are detected by the moving vehicle, whereby the position of the moving vehicle can be measured.

Thus, according to the present invention, a position of a moving vehicle can be measured by utilizing reflection of lights. Accordingly, as compared with a conventional method for measuring a position of a moving vehicle using a radio wave, an apparatus of the present invention can be structured simply and manufactured at low cost and in addition, it is not subjected to any regulations of the Electric Wave Law and will never be influenced by radio noise. Furthermore, there is little necessity of maintenance or inspection of the light reflecting means and thus the time and the work required for such purposes can be considerably reduced.

These object and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an illustration showing a position relation between the moving vehicle 3 and the light reflecting means 2R and 2L, and FIG. 6 is a typical geometric diagram based on FIG. 5.

FIG. 8 is an illustration showing a position relation between the moving vehicle 3 and the light reflecting means 2R and 2L; FIG. 9 is a typical geometric diagram based on FIG. 8; and FIG. 10 is an enlarged view around the points A, B and C in FIG. 9.

FIG. 16 is an illustration showing a position relation between the present position of the moving vehicle 3 on the road 1 and the light reflecting means 2R and 2L, and FIG. 17 is a typical geometric diagram based on FIG. 16.

DESCRIPTION OF THE PREFERRED EMBODIMENTS

Figure 1:
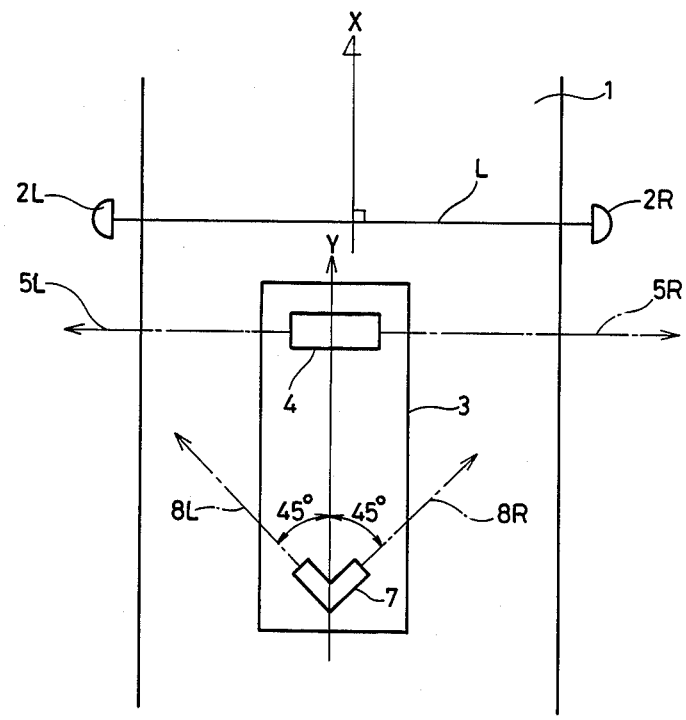
FIG. 1 is an illustration showing an outline of an embodiment of the present invention.

FIG. 1 is an illustration showing an outline of an embodiment of the present invention. Referring to FIG. 1, light reflecting means 2R and 2L are provided on the right side and on the left side of the road 1, respectively. These light reflecting means 2R and 2L has an optical characteristic for reflecting an incident light at the same angle as the angle of incidence with respect to the plane of incidence. For example, corner cubes are used for these light reflecting means. The light reflecting means 2R and 2L are positioned so that a line segment L connecting these means is perpendicular to a predetermined reference direction X. This reference direction X may be selected to be parallel to the road 1 for example, or may be selected to be coincident with the direction from north to south or from east to west for example independently of the direction in which the road 1 runs.

On the other hand, a moving vehicle 3 such as a car is provided with a direction measuring scanner 4 for measuring the moving direction Y of the moving vehicle 3 and a position measuring scanner 7 for measuring the present position thereof. The direction measuring scanner 4 emits light beams 5R and 5L to the right and left directions, respectively, perpendicularly to the moving direction Y of the moving vehicle 3. The position measuring scanner 7 emits a light beam 8R to the right with an angle of 45° with respect to the moving direction Y of the moving vehicle 3 and emits a light beam 8L to the left with an angle of 45° with respect thereto.

Figure 2:
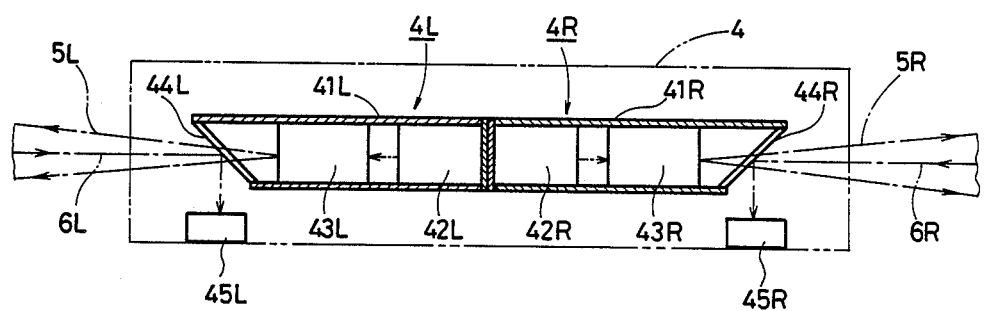
FIG. 2 is an illustration showing an internal structure of the direction measuring scanner 4 shown in FIG. 1.

FIG. 2 is an illustration showing a front view of an internal structure of the direction measuring scanner 4 shown in FIG. 1. Referring to FIG. 2, the direction measuring scanner 4 comprises a pair of light emitting and receiving units 4R and 4L on the right and on the left respectively. The light emitting and receiving unit 4L emits a light to the left of the moving vehicle 3 and the light emitting and receiving unit 4R emits a light to the right of the moving vehicle 3. These light emitting and receiving units 4R and 4L have the same structure symmetrically and therefore only the light emitting and receiving unit 4R on the right side will be described hereinafter. A mirror cylinder 41R contains a light supplier 42R, a lens 43R and a half mirror 44R. As the light supplier 42R, a laser light supplier, for example, having acute directivity is used. The lens 43R changes the light emitted from the light supplier 42R to a flat light beam 5R spreading vertically. By using such a flat beam, the light beam 5R can be applied to the light reflecting means 2R without fail if the moving vehicle 3 vibrates to some extent. The light beam 5R from the lens 43R is transmitted through the half mirror 44R and emitted to the outside. The half mirror 44R reflects the reflected light 6R from the light reflecting means 2R. A light receiver 45R is provided at such a position that it can detect the reflected light from the half mirror 44R. As the light receiver 45R, a photodiode or a phototransistor for example is used. This light receiver 45R provides a detection signal upon receipt of the reflected light from the half mirror 44R.

Figure 3:
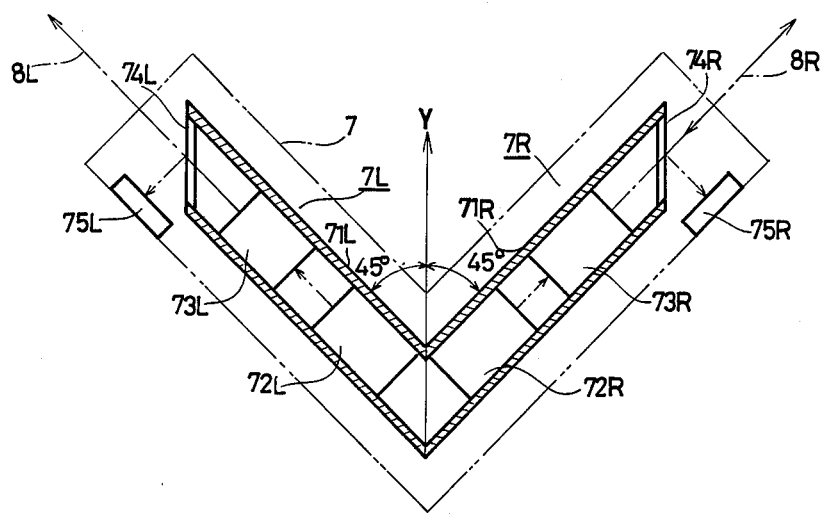
FIG. 3 is an illustration showing an internal structure of the position measuring scanner 7 shown in FIG. 1.

FIG. 3 is an illustration showing a top view of an internal structure of the position measuring scanner 7 shown in FIG. 1. Referring to FIG. 3, the position measuring scanner 7 comprises a pair of light emitting and receiving units 7R and 7L on the right and on the left respectively with an angle of 90° formed therebetween. The light emitting and receiving unit 4L emits a light beam 8L to the left with an angle of 45° with respect to the moving direction Y of the moving vehicle 3. The light emitting and receiving unit 7R emits a light beam 8R to the right with an angle of 45° with respect to the moving direction Y of the moving vehicle 3. Since these light emitting and receiving units 7L and 7R have the same structure symmetrically, only the light emitting and receiving unit 7R on the right side will be described in the following. A mirror cylinder 71R contains a light supplier 72R, a lens 73R and a half mirror 74R. As the light supplier 72R, a laser light supplier, for example, having acute directivity is used. The lens 73R changes the light emitted from the light supplier 72R to a flat light beam 8R spreading vertically. In FIG. 3, the light beam 8R looks linear because the position measuring scanner 7 is viewed from the top. By using such a flat beam 8R, the light beam 8R can be applied to the light reflecting means 2R without fail if the moving vehicle 3 vibrates to some extent. The light beam 8R from the lens 73R is transmitted through the half mirror 74R and emitted to the outside. The half mirror 74R reflects the reflected light from the light reflecting means 2R. A light receiver 75R is provided at such a position that it can detect the reflected light from the half mirror 74R. As the light receiver 75R, a photodiode, a phototransistor or the like is used. It provides a detection singal upon receipt of the reflected light from the half mirror 74R. Thus, the position measuring scanner 7 shown in FIG. 3 has almost the same structure as that of the direction measuring scanner 4 shown in FIG. 2.

Figure 4:
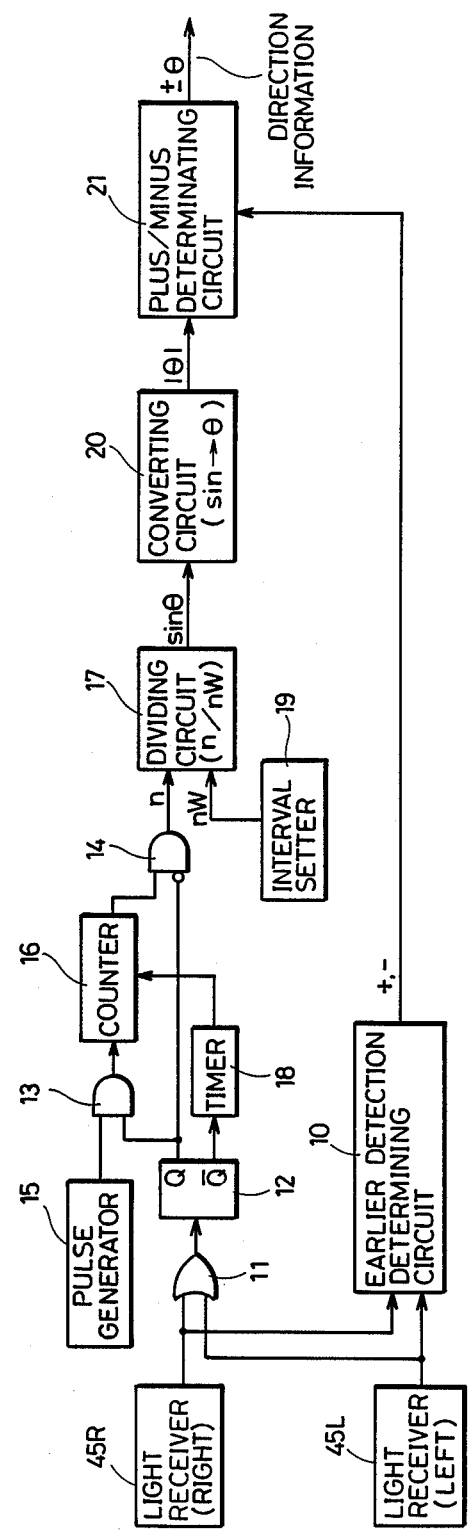
FIG. 4 is a schematic block diagram showing a direction measuring apparatus mounted on a moving vehicle 3 in the embodiment shown in FIG. 1.
Figure 5:
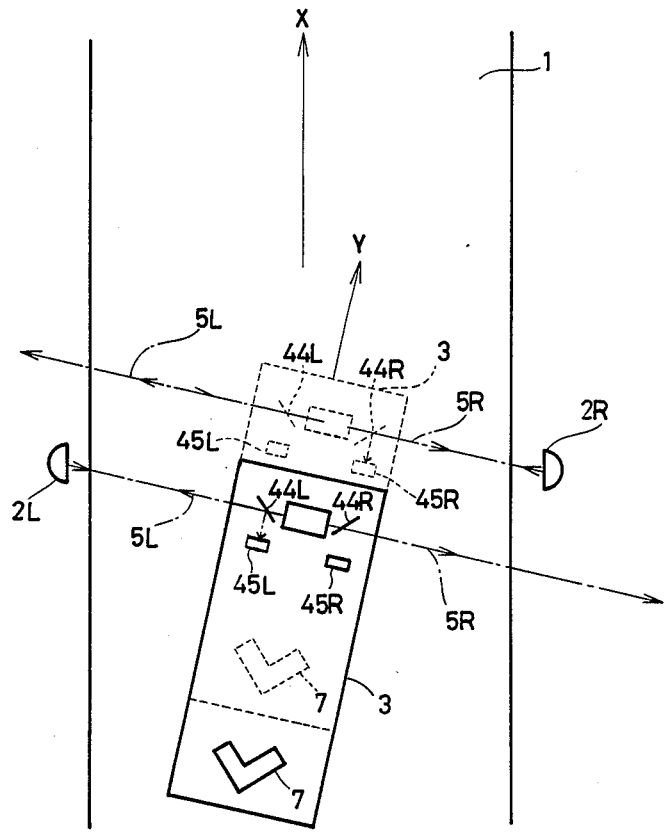
FIGS. 5 and 6 are illustrations for explaining direction measuring operation performed in the embodiment shown in FIG. 1. Particularly.
Figure 6:
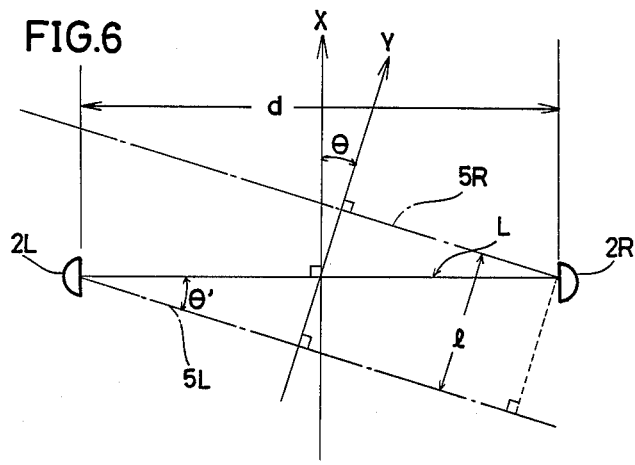

FIG. 4 is a schematic block diagram showing a direction measuring apparatus mounted on the moving vehicle 3. FIGS. 5 and 6 are illustrations for explaining the operation of the direction measuring apparatus shown in FIG. 4. In the following, the structure and the operation of the direction measuring apparatus shown in FIG. 4 will be described with reference to FIGS. 5 and 6.

Now let us assume that the moving direction Y of the moving vehicle 3 has an angle of $\theta$ with respect to the reference direction X. In this case, as shown in FIG. 5, the light beam 5L from the light emitting and receiving unit 4L on the left side is first applied to the light reflecting means 2L. Since the light reflecting means 2L reflects the received light beam 5L at the same angle as the angle of incidence with respect to the plane of incidence, the reflected light is returned to the half mirror 44L and reflected on this half mirror 44L so as to be applied to the light receiver 45L. As a result, the light receiver 45L provides a detection output and supplies it to an earlier detection determining circuit 10 as well as to a flip-flop 12 through an OR gate 11. This flip-flop 12 is set by the output of the light receiver 45L which first detects the reflected light, since this flip-flop 12 is a flip-flop for providing a set output by the first input and providing a reset output by the subsequent input. The set output (at a high level) of the flip-flop 12 is supplied to an AND gate 13 to enable the AND gate 13 and at the same time, this set output is inverted to a low level so as to be supplied to an AND gate 14 so that the AND gate 14 is disabled. As a result, pulses generated from a pulse generator 15 are supplied to a counter 16 through the AND gate 13 so that the counter 16 counts the number of pulses supplied thereto. The pulse generator 15 generates a pulse each time the moving vehicle 3 advances by a predetermined unit distance. A rotary encoder for example for detecting the revolutions of the wheels of the moving vehicle 3 is used as the pulse generator 15. Thus, by counting the number of pulses outputted from the pulse generator 15, the moving distance of the moving vehicle 3 can be measured.

When the moving vehicle 3 moves a little to reach the position shown by the dotted lines in FIG. 5, the light beam 5R from the light emitting and receiving unit 4R the light reflecting means 2R. As a result, the reflected light from the light reflecting means 2R returns to the half mirror 44R, on which it is reflected to be applied to the light receiver 45R. Then, the light receiver 45R provides a detection output and supplies it to the earlier detection determining circuit 10 as well as to the flip-flop 12 through the OR gate 11. The flip-flop 12 inverts the output logical state because the output of the light receiver 45R is the second signal, and thus, a low level signal is provided from a set output terminal and a high level signal is provided from a reset output terminal. In consequence, the AND gate 13 is disabled and the AND gate 14 is enabled. Thus, the counter 16 counts the number n of pulses having correlation with the moving distance l of the moving vehicle 3 specified in a period from the time of detection of the reflected light by the light receiver 45L to the time of detection of the reflected light by the light receiver 45R and the counter 16 applies the count value n to one input of a dividing circuit 17 through the AND gate 14. The reset output of the flip-flop 12 is supplied as a reset signal for the counter 16 with a time delay determined by a timer 18.

A set value nw of an interval setter 19 is supplied to the other input of the above stated dividing circuit 17. The value nw correlated with the distance d between the light reflecting means 2R and 2L is preset in the interval setter 19. In other words, the number of pulses expected to be obtained from the pulse generator 15 by the movement of the moving vehicle 3 by the above stated distance d is preset in the interval setter 19. Thus, the dividing circuit 17 divides the count value n of the counter 16 by the set value nw correlated with the distance between the light reflecting means 2R and 2N (namely, it makes division: n/nw) to obtain sin $\theta'$. This angle $\theta'$ is an angle formed by the light beams 5L and 5R with respect to the line segment L connecting the light reflecting means 2R and 2L and this angle is equal to the angle $\theta$ formed by the moving direction Y of the moving vehicle 3 with respect to the reference direction X. Accordingly, the dividing circuit 17 calculates sin $\theta$. The output of the dividing circuit 17 is supplied to a converting circuit 20, in which sin $\theta$ is converted to the angle $\theta$. This converting 20, through not shown, comprises an ROM in which the anti-logarithms (sine values) of sin $\theta$ ($0 \leq \theta < 90°$) are set in the respective addresses, so that the angle corresponding to the anti-logarithm equal to the value obtained by the division (n/nw) in the dividing circuit 17 is read out. The angle $\theta$ provided from the converting circuit 20 is an absolute value, from which it is not clear whether the angle $\theta$ is a positive value or a negative value with respect to the reference direction X. Therefore, the output of the converting circuit 20 is supplied to a plus/minus determining circuit 21 to determine whether the angle $\theta$ is a positive value or a negative value.

The above stated earlier detection determining circuit 10 determines whether the detection output of the light receiver 45R or the detection output of the light receiver 45L comes earlier, and it supplies the output of determination to the plus/minus determining circuit 21. The plus/minus determining circuit 21 determines whether the angle $\theta$ is a positive value or a negative value based on the output of the earlier detection determining circuit 10. More specifically, the plus/minus determining circuit 21 determines that the angle $\theta$ is a negative value (−) when the earlier detection determining circuit 10 determines that the detection output of the light receiver 45R comes earlier, and it determines that the angle is a positive value (+) when the earlier detection determining circuit 10 determines that the detection output of the light receiver 45L comes earlier. For example, if the moving vehicle 3 moves as shown in FIG. 5, the light receiver 45L provides the detection output earlier and as a result, the earlier detection determining circuit 21 determines that the angle $\theta$ is a positive value (+) and provides an output $+\theta$.

As described above, the direction measuring apparatus shown in FIG. 4 is capable of accurately measuring the deviation angle $\theta$ formed by the moving direction Y of the moving vehicle 3 with respect to the reference direction X.

Figure 7:
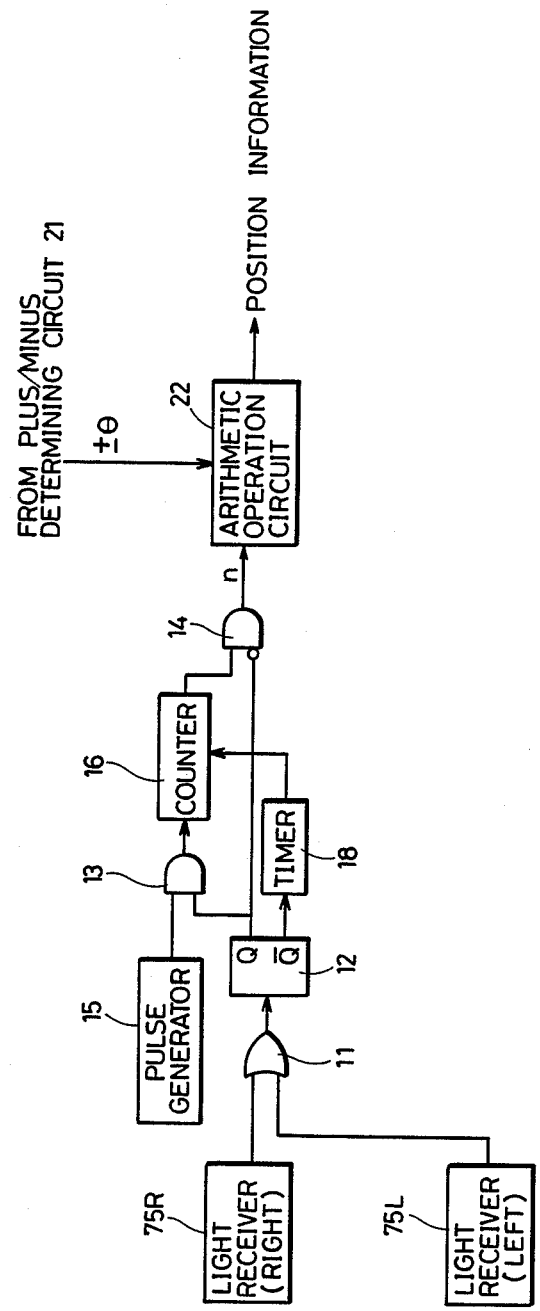
FIG. 7 is a schematic block diagram showing a position measuring apparatus mounted on a moving vehicle 3 in the embodiment shown in FIG. 1.

FIG. 7 is a schematic block diagram showing a position measuring apparatus mounted on the moving vehicle 3. The same portions as in the direction measuring apparatus shown in FIG. 4 are denoted by the same reference numerals and description thereof is omitted. Referring to FIG. 7, the outputs of the light receivers 75R and 75L shown in FIG. 3 are supplied to the respective inputs of the OR gate 11. Circuit components 11 through 16 and 18 form a means for measuring the moving distance of the moving vehicle 3, the structure and the operation thereof being the same as shown in FIG. 4. The output of the AND gate 14 is supplied to an arithmetic operation circuit 22. The arithmetic operation circuit 22 also receives the direction information of the moving vehicle 3 (the deviation angle $\theta$ formed by the moving direction Y of the moving vehicle 3 with respect to the reference direction X) from the plus/minus determining circuit 21 shown in FIG. 4. The arithmetic operation circuit 22 comprises for example a microcomputer and the like not shown and serves to calculate the present position of the moving vehicle 3.

Figure 8:
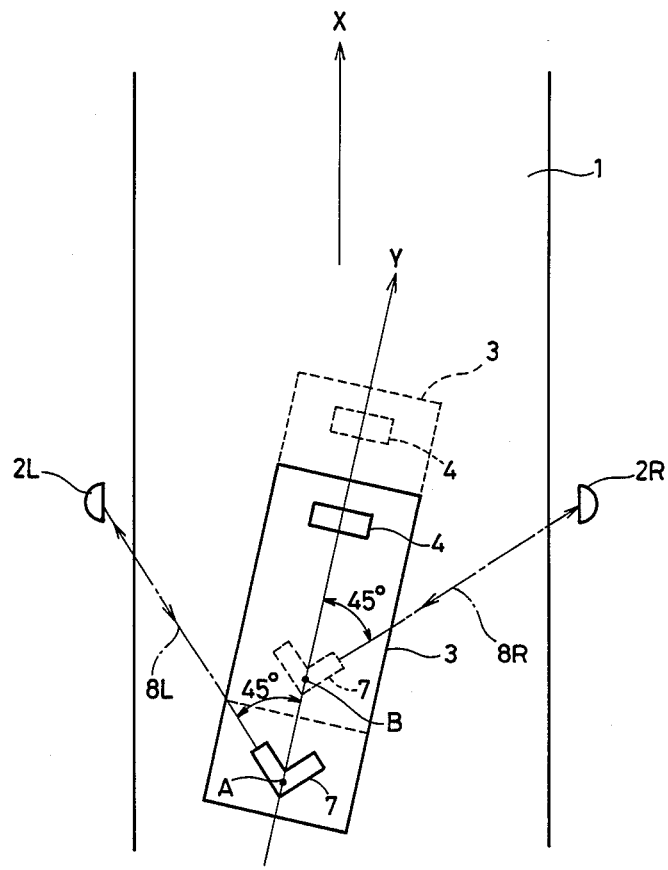
FIGS. 8 through 10 are illustrations for explaining position measuring operation performed in the embodiment shown in FIG. 1. Particularly.
Figure 9:
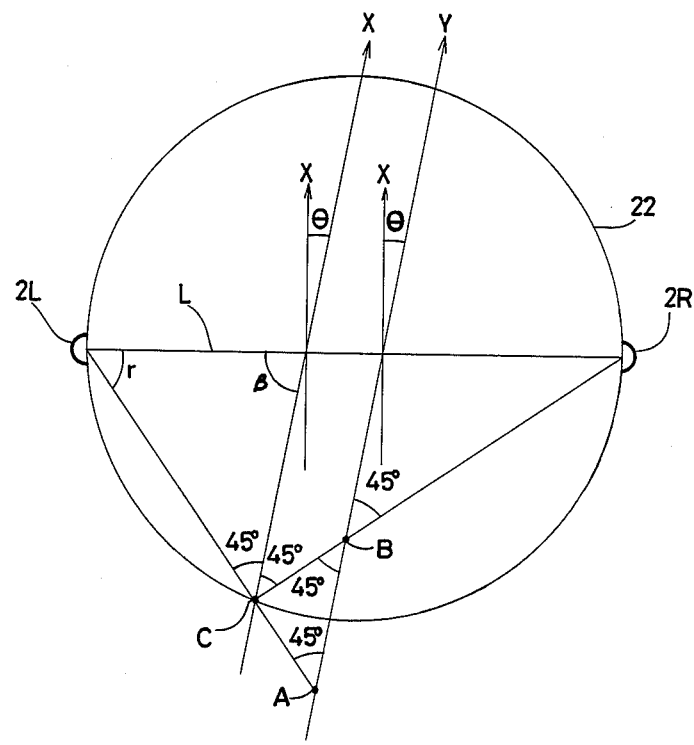
Figure 10:
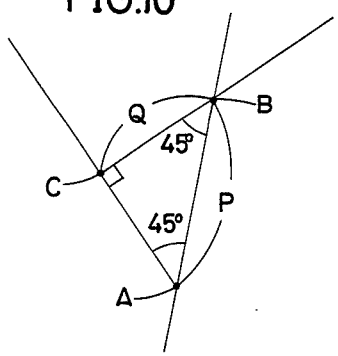
Figure 11:
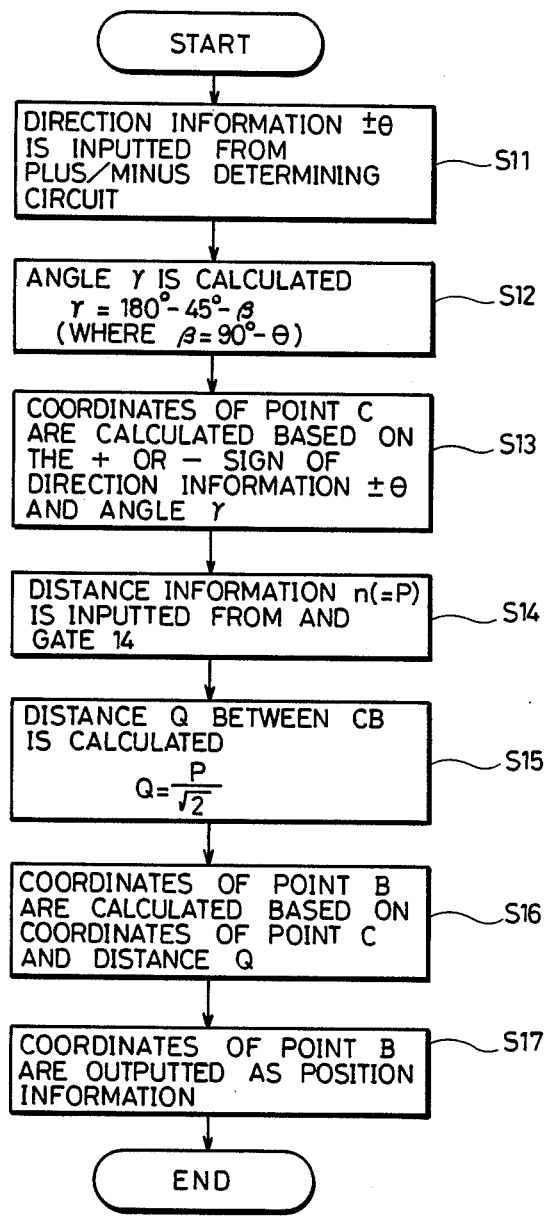
FIG. 11 is a flow chart for explaining the operation of the arithmetic operation circuit 22 shown in FIG. 7.

FIGS. 8 to 11 are illustrations for explaining the operation of the position measuring apparatus shown in FIG. 7. Particularly, FIG. 5 is an illustration showning the moving state of the moving vehicle 3 on the road 1; FIGS. 9 and 10 are diagrams geometrically showing the position relation between the moving vehicle 3 and the light reflecting means 2R and 2L; and FIG. 11 is a flow chart showing the operation of the arithmetic operation circuit 22. In the following, the operation of the position measuring apparatus shown in FIG. 7 will be described with reference to FIGS. 8 through 11. Now let us assume a case in which the light beam 8L hits the light reflecting means 2L when the position measuring scanner 7 arrives at the point A and the light beam 8R hits the light reflecting means 2R when the position measuring scanner 7 arrives at the point B, as shown in FIG. 8. In this case, the distance P between the point A and the point B is measured by the OR gate 11, the flip-flop 12, the AND gates 13 and 14, the pulse generator 15, the counter 16 and the timer 18. This measuring operation is the same as described above in connection with FIG. 4 and therefore, the description thereof is omitted. Now, the operation of the arithmetic operation circuit 22 will be described. The arithmetic operation circuit 22 first receives the direction information $\pm\theta$ from the plus/minus determining circuit 21 as shown in the step S11 in FIG. 11. Then, in the step S12, it calculates according to the below indicated equation the angle $\gamma$ formed by the line segment connecting the light reflecting means 2R and 2L and the line segment connecting the light reflecting means 2L and the point A.

$$\gamma = 180° - 45° - \beta$$

where $\gamma = 90° - \theta$

Then, in the subsequent step S13, coordinates of a point C are calculated based on the positive or negative value of the direction information $\pm\theta$ and the angle $\gamma$. This point C is a point of intersection between a circle 22 having a diameter of the line segment L connecting the light reflecting means 2R and 2L and the line segment connecting the point A and the light reflecting means 2L. As the coordinate positions of the light reflecting means 2R and 2L are known beforehand, an equation concerning the circle 22 is also known beforehand. Accordingly, if the angle γ is obtained, it is easy to calculate the coordinates of the point C. Then, the program proceeds to the step S14, in which the distance information n is received from the AND gate 14. This distance information n relates to the distance moved by the moving vehicle 3 in a period after the detection of the reflected light by one of the light receivers 75R and 75L till the detection of the reflected light by the other and this distance is equal to the distance P between the points A and B. Subsequently, in the step S15, the distance Q between the points C and B is calculated. As shown in FIG. 10, the triangle formed by the points A, B and C as the vertexes is a right-angled isosceles triangle and accordingly the distance Q can be easily calculated by the following equation:

$$Q = P/\sqrt{2}$$

Then, the program proceeds to the step S16, in which the coordinates of the point B are calculated based on the coordinates of the point C and the distance Q. The coordinates of the point B exist on the line segment connecting the point C and the light reflecting means 2R and are located at the distance Q from the point C. Subsequently, in the step S17, the coordinates of the point B calculated in the step S16 are provided as the position information.

If the moving vehicle 3 passes on the point C with an azimuth angle θ, the light beams 8R and 8L hit simultaneously the light reflecting means 2R and 2L and as a result, the detection outputs can be obtained simultaneously from the light receivers 75R and 75L. Consequently, the distance P in this case becomes zero and the distance Q calculated in the step S15 becomes also zero. Thus, the coordinate position of the point C is calculated as the present position.

As to the direction information and the position information obtained as described above, various manners of utilization can be considered. For example such information may be displayed on a display device or may be used as the information for automatic control. In order to perform automatic control, a plurality of sets of light reflecting means may be disposed at predetermined intervals along the road 1.

Figure 12:
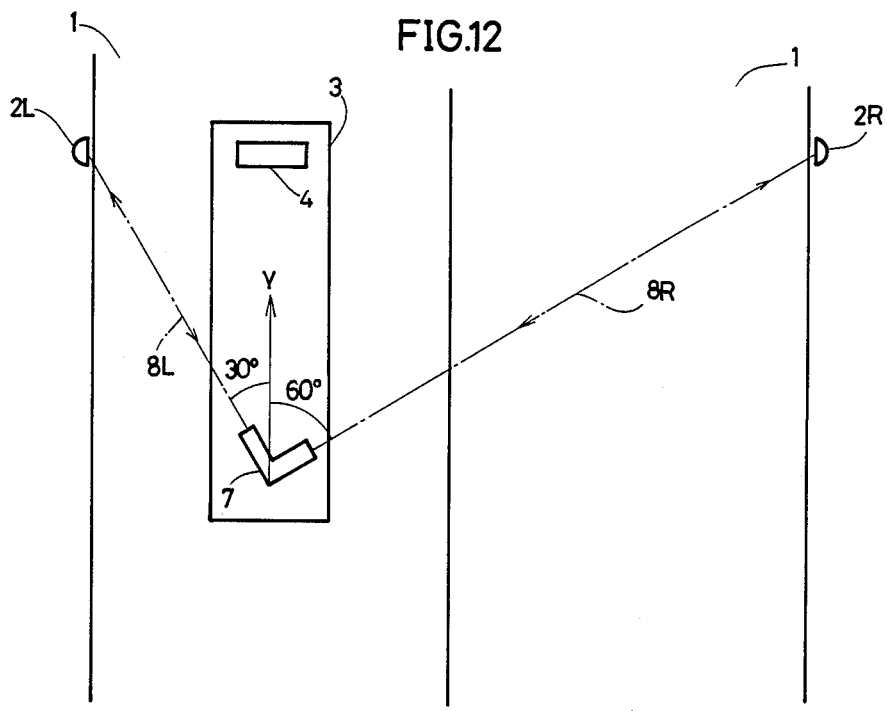
FIG. 12 is an illustration showing a variant of the embodiment shown in FIG. 1.

FIG. 12 is an illustration showing an outline of a variant of the embodiment shown in FIG. 1. In this variant in FIG. 12, the road 1 on which the moving vehicle 3 passes includes two courses and light reflecting means 2R and 2L are provided on the right side and the left side, respectively, of the road of two courses. In this case, the position measuring scanner 7 is disposed to emit the light beam 8R to the right with an angle of 60° with respect to the moving direction Y of the moving vehicle 3 and to emit the light beam 8L to the left with an angle of 30° with respect thereto. Although a geometric approach for obtaining the present position of the moving vehicle 3 in this variant is a little different from that in the above described embodiment, those skilled in the art could easily make such approach from the above described embodiment and therefore the description thereof is omitted.

In the above described embodiment, the position measuring scanner 7 for emitting the light beams 8R and 8L with an angle of 90° therebetween is used. However, the embodiment is not limited thereto and a position measuring scanner for emitting the light beams 8R and 8L with other opening angle may be used. Theoretically, the present position of the moving vehicle 3 can be measured unless the angle between the light beams 8R and 8L is 180°.

In addition, in the above described embodiment, the position measuring scanner 7 is disposed so as to emit light beams forward from the moving vehicle 3. However, the position measuring scanner 7 may be disposed to emit light beams backward from the moving vehicle 3.

In addition, although the above described embodiment is structured to measure an absolute position of the moving vehicle 3, if it suffices to only measure a relative position thereof with respect to the light reflecting means 2R and 2L, it is not needed to know the coordinate positions of the light reflecting means 2R and 2L and only the installation distance therebetween needs to be calculated. This installation distance information may be preset within the moving vehicle 3 or may be transmitted from any external transmitting means to the moving vehicle 3.

Figure 13:
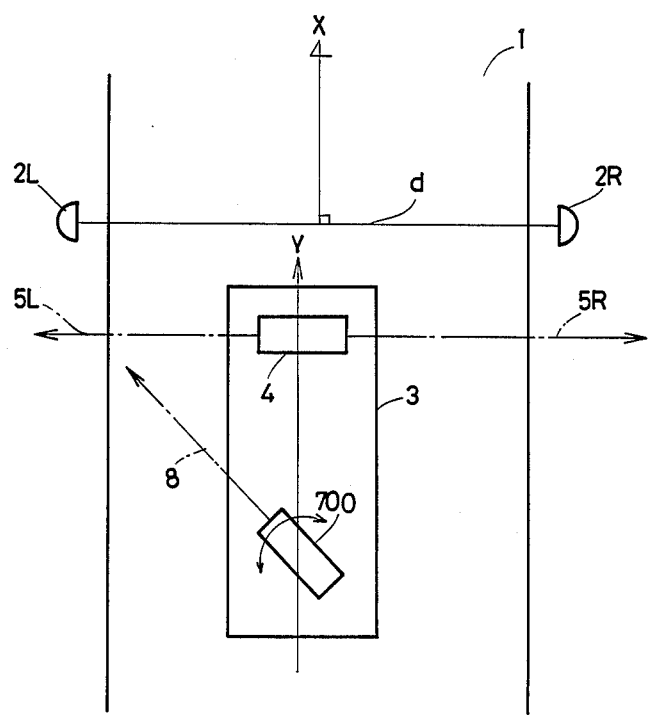
FIG. 13 is an illustration showing an outline of another embodiment of the present invention.

FIG. 13 is an illustration showing an outline of a further embodiment of the present invention. In this embodiment, a rotatable position measuring scanner 700 is provided instead of the fixed type position measuring scanner 7 used in the embodiment shown in FIG. 1. The other portions are the same as in the embodiment in FIG. 1 and the description thereof is omitted by designating the corresponding portions by the same reference numerals.

Figure 14:
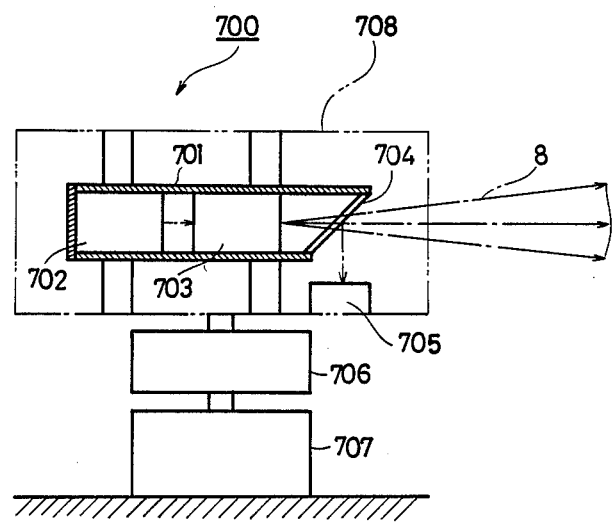
FIG. 14 is an illustration showing an internal structure of the position measuring scanner 700 shown in FIG. 13.

FIG. 14 is an illustration showing a front view of an inner structure of the position measuring scanner 700 shown in FIG. 13. Referring to FIG. 14, a mirror cylinder 701 is contained within a housing 708. This mirror cylinder 701 contains a light supplier 702, a lens 703 and a half mirror 704. As the light supplier 702, a light supplier for emitting a laser light, for example, having acute directivity is used. The lens 703 changes the light emitted from the light supplier 702 to a flat light beam 8 spreading vertically. By using such a flat light beam 8, the light beam 8 can be applied to the light reflecting means 2R and 2L without fail if the moving vehicle 3 vibrates to some extent. The light beam 8 from the lens 703 is transmitted through the half mirror 704 and emitted to the outside. The half mirror 704 receives and reflects the reflected lights from the light reflecting means 2R and 2L. A light receiver 705 is provided at a position where it can detect the reflected light from the half mirror 704. As the light receiver 705, a photodiode, a phototransistor or the like is used and it provides a detection signal upon receipt of the reflected light from the half mirror 704. The housing 708 is coupled to an encoder 706 and a motor 707. The motor 707 rotates the housing 708 so that the light beam 8 rotates around the moving vehicle 3 to make scanning. The encoder 706 detects the rotating angle of the light beam 8 and the reference angle for detection is selected to be coincident with the moving direction Y of the moving vehicle 3.

In the above described embodiment shown in FIG. 13, the direction measuring apparatus mounted on the moving vehicle 3 has the entirely same structure as that of the direction measuring apparatus shown in FIG. 4.

Figure 15:
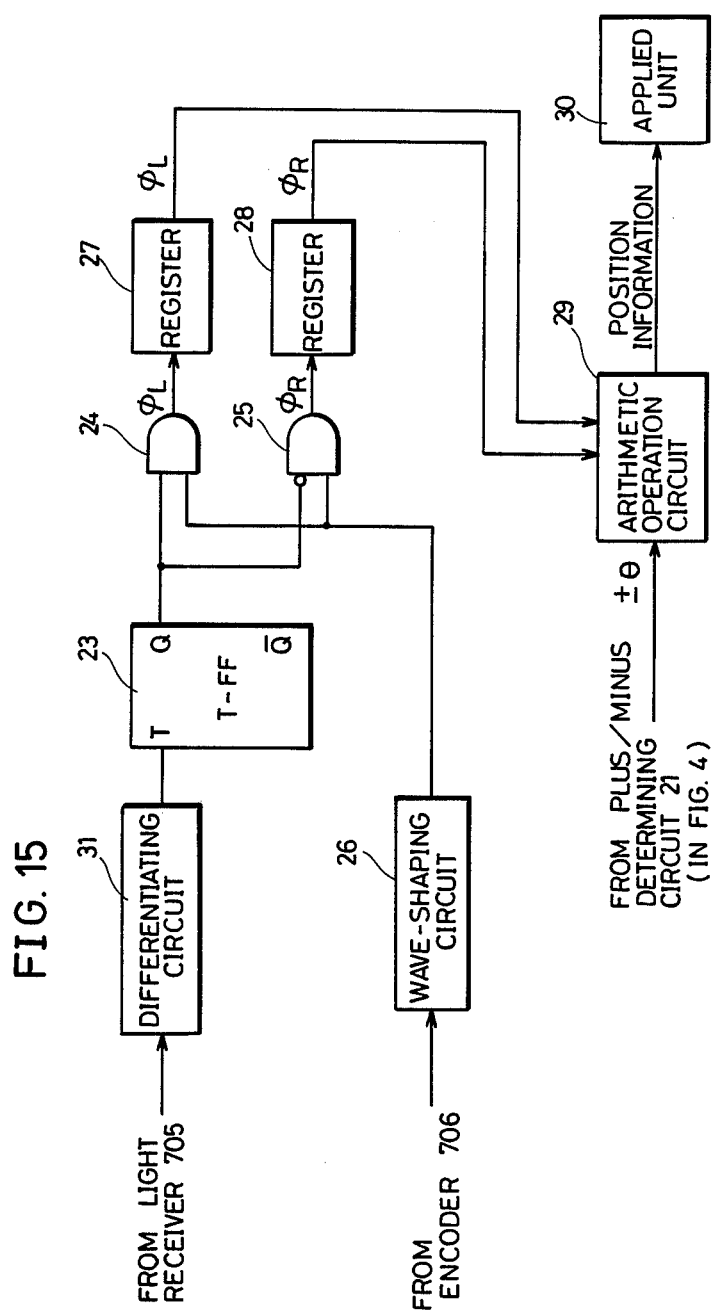
FIG. 15 is a schematic block diagram showing a position measuring apparatus mounted on a moving vehicle 3 in the embodiment shown in FIG. 13.

FIG. 15 is a schematic block diagram showing a position measuring apparatus mounted on the moving vehicle 3 in the embodiment shown in FIG. 13. Referring to FIG. 15, a differentiating circuit 31 receives the output of the light receiver 705 shown in FIG. 14. The output of the differentiating circuit 31 is supplied to a T-flip-flop 23. This T-flip-flop 23 is structured so that the output thereof is inverted each time a differentiated pulse is applied thereto from the differentiating circuit 22. The Q output of the T-flip-flop 23 is supplied to one input of an AND gate 24 and at the same time it is inverted and supplied to one input of an AND gate 25. The respective other inputs of these AND gates 24 and 25 receive the output of a wave-shaping circuit 26. This wave-shaping circuit 26 is a circuit for shaping the output of the encoder 706 shown in FIG. 3 to a pulse signal. The outputs of the AND gates 24 and 25 are supplied to resisters 27 and 28 respectively. The outputs of the resisters 27 and 28 are supplied to an arithmetic operation circuit 29. The arithmetic operation circuit 29 receives the direction information from the plus/minus determining circuit 21 shown in FIG. 4. The arithmetic operation circuit 29 calculates the present position of the moving vehicle 3 based on the data or information supplied thereto and the output of the arithmetic operation circuit 29 is supplied to an applied unit 30. As the applied unit 30, various devices such as an automatic control device or a display device for example may be considered.

Figure 16:
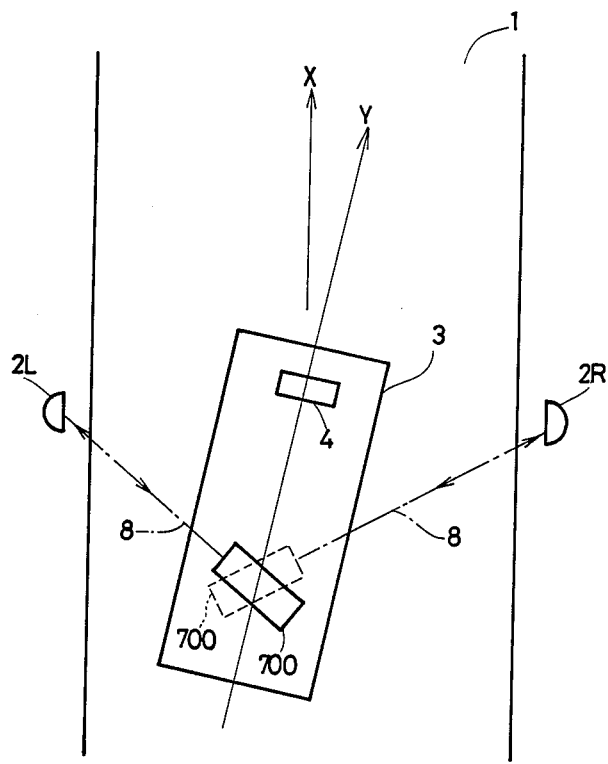
FIGS. 16 and 17 are illustrations for explaining position measuring operation performed in the embodiment shown in FIG. 13. Particularly.
Figure 17:
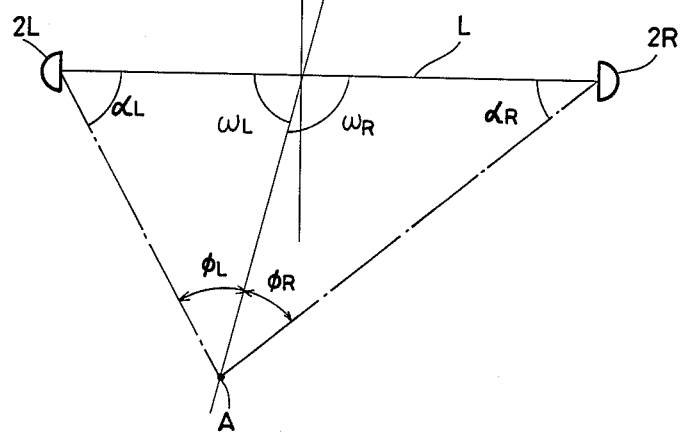

FIGS. 16 and 17 are illustrations for explaining the operation of the measuring apparatus shown in FIG. 15. Particularly, FIG. 16 represents the moving state of the moving vehicle 3 on the road 1 and FIG. 17 represents geometrically the position relation between the moving vehicle 3 and the light reflecting means 2R and 2L. Referring to FIGS. 16 and 17, the operation of the position measuring apparatus shown in FIG. 15 will be described in the following. Now let us assume that the moving direction of the moving vehicle 3 has been measured by the direction measuring scanner 4 and the direction measuring apparatus shown in FIG. 4. In this state, the position measuring scanner 700 is rotated by the motor 707 and accordingly the light beam 8 is rotated to make scanning. If the light beam 8 hits the light reflecting means 2L for example, the reflected light from the light reflecting means 2L returns to the half mirror 704 of the position measuring scanner 700 as the light reflecting means 2L reflects light beam at the same angle as the angle of incidence with respect to the plane of incidence, and the reflected light is reflected on the half mirror 704 and applied to the light receiver 705. Thus, the light receiver 705 provides a detection output. The detection output of the light receiver 705 is differentiated by the differentiating circuit 31 and supplied as a differentiated pulse to the T-flip-flop 23. If the Q output of the T-flip-flop 23 is originally at the low level, the Q output is inverted to the high level because the differentiated pulse is received. As a result, the AND gate 24 is opened and the AND gate 25 is closed. In consequence, the angle data $\phi L$ provided from the encoder 706 and wave-shaped by the wave-shaping circuit 26 is stored into the resister 27 through the AND gate 24. Then, if the position measuring scanner 700 is rotated to be moved to the position shown by the dotted lines in FIG. 16, the light beam 8 hits the light reflecting means 2R. It is assumed in this case that the moving vehicle 3 moves little in a period after the hitting of the light beam 8 onto the light reflecting means 2L till the hitting thereof onto the light reflecting means 2R because the rotating speed of the position measuring scanner 700 by means of the motor 707 is considerably fast. The light reflecting means 2R reflects the incident light beam 8 at the same angle as the angle of incidence. As a result, the half mirror 704 receives the reflected light from the light reflecting means 2R and reflects the light. The reflected light from the half mirror 704 is received by the light receiver 705 and a detection output is provided therefrom. As a result, a differentiated pulse is provided from the differentiating circuit 31 and the output state of the T-flip-flop 23 is inverted. In other words, the Q output falls to the low level. In this state, the AND gate 24 is closed and the AND gate 25 is opened. In consequence, the angle data $\phi R$ from the encoder 706 passes through the AND gate 25 and is stored in the resister 28. Then, the arithmetic operation circuit 29 calculates the present position of the moving vehicle 3 based on the angle data $\phi L$ and $\phi R$ stored in the resisters 27 and 28 and the direction information $\pm \theta$ from the plus/minus determining circuit 21 (seen FIG. 4). This calculation is performed in the following manner.

First, the arithmetic operation circuit 29 calculates the angles $\alpha L$ and $\alpha R$ shown in FIG. 17 by the below indicated equations (1) and (2). The angle $\alpha L$ is an angle formed between the line segment connecting the light reflecting means 2L and the light reflecting means 2R and the line segment connecting the light reflecting means 2L and the present position A of the moving vehicle 3, and the angle $\alpha R$ is an angle formed between the line segment connecting the light reflecting means 2R and the light reflecting means 2L and the line segment connecting the light reflecting means 2R and the present position A of the moving vehicle 3.

$$\alpha L = 180° - \omega L - \phi L \tag{1}$$

$$\alpha R = 180° - \omega R - \phi R \tag{2}$$

Where $$\omega L = 90° - \theta \text{ and } \omega R = 90° + \theta.$$

In calculation of those angles $\omega L$ and $\omega R$, it is determined by the sign of the direction information $\theta$ provided from the plus/minus determining circuit 21 whether $\theta$ is to be added to or to be subtracted from 90°. When the above stated angles $\alpha L$ and $\alpha R$ are calculated, the coordinate position of the present position A of the moving vehicle 3 is calculated. This calculation can be made easily from the angles $\alpha L$ and $\alpha R$ because the coordinate positions of the light reflecting means 2R and 2L are already known and set in the arithmetic operation circuit 29 (or they are transmitted from the outside to the moving vehicle 3 by any suitable transmitting means). However, if it is only necessary to calculate a relative position with respect to the light reflecting means 2R and 2L, it is not required to calculate the coordinate positions of the light reflecting means 2R and 2L and only the distance of installation of the light reflecting means 2R and 2L needs to be measured.

Although the above described respective embodiments use the direction measuring scanner 4 and the direction measuring apparatus shown in FIG. 4 as the means for measuring the moving direction of the moving vehicle 3, a gyroscope, an azimuth magnet and the like may be used instead thereof.

It goes without saying that the present invention is applicable not only to a car but also to various vehicles such as a golf cart in a golf course, an airplane running on a running course of an airport, carriers in an airport, a guide wagon for guiding a blind person, an automatic cleaner, agricultural implements, construction machinery and the like. In other words, the present invention can be applied to all the moving vehicles moving on the ground or on the floor. If the present invention is applied to a moving vehicle moving indoors, the light reflecting means 2R and 2L may be provided on the wall or on the ceiling.

In addition, the light reflecting means 2R and 2L in the above described respective embodiments are provided at positions having almost the same height as that of the moving vehicle. However, they may be provided at higher positions than the moving vehicle or at lower positions than the moving vehicle. In such a manner, the present invention can be applied to a vehicle moving in the air. For example, the present invention is applied for such purposes as giving instructions to a helicopter in a heliport or an airplane in landing, controlling movement of a crane etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for measuring the position of a moving vehicle by utilizing reflection of light, comprising
   light reflecting means disposed along a course for said moving vehicle and positioned in a predetermined relationship to a predetermined reference direction of movement for said vehicle, said light reflecting means having first and second reflectors with an optical characteristic for reflecting an incident light beam back along its path of incidence, said reflectors being disposed in spaced relationship so that said vehicle passes through the space between said reflectors while moving along said course,
   light emitting means in said vehicle for emitting lights to the outside of said moving vehicle,
   means in said vehicle for directing light emitted by said light emitting means laterally outward on each side of said vehicle and in such a direction that light strikes each of said reflectors as said vehicle passes proximate thereto,
   photodetecting means in said vehicle for detecting light reflected from said light reflecting means, and positioned to receive light form each of said reflecting means, said photodetecting means producing first and second electrical signals indicating the detection of light from said first and second reflectors respectively,
   moving direction measuring means in said vehicle responsive to said first and second electrical signals for measuring the angle of deviation of the direction of movement of said moving vehicle with respect to said reference direction, and
   position detecting means in said vehicle for detecting a position of said moving vehicle based on the angle of deviation measured by said moving direction measuring means and said first and second electrical signals of said photodetecting means.

2. A position measuring apparatus of a moving vehicle in accordance with claim 1 wherein
   said light reflecting means comprises first and second light reflecting means provided at different positions.

3. A position measuring apparatus of a moving vehicle in accordance with claim 2 wherein
   said light emitting means comprises
      first light emitting means for emitting light to the right with a predetermined angle with respect to the moving direction of said moving vehicle and
      second light emitting means for emitting light to the left with a predetermined angle with respect to the moving direction of said moving vehicle,
   said photodetecting means comprises
      a first photodetector provided in association with said first light emitting means for detecting the light emitted from said first light emitting means and reflected from said first light reflecting means and
      a second photodetector provided in association with said second light emitting means for detecting the light emitted from said second light emitting means and reflected from said second light reflecting means, and
   said position detecting means comprises
      moving distance measuring means for measuring a moving distance of said moving vehicle specified in a period from the time when one of said first and second photodetectors detects said reflected light to the time when the other of said first and second photodetectors detects said reflected light and
      calculating means for calculating a position of said moving vehicle based on a predetermined equation using as parameters the moving direction measured by said moving direction measuring means and the moving distance measured by said moving distance measuring means.

4. A position measuring apparatus of a moving vehicle in accordance with claim 3 wherein
   said first and second light emitting means are located to emit lights to the right and to the left, respectively, with angles symmetric to each other with respect to the moving direction of said moving vehicle.

5. A position measuring apparatus of a moving vehicle in accordance with claim 4 wherein
   said first light emitting means is located to emit light to the right with an angle of approximately 45° with respect to the moving direction of said moving vehicle and
   said second light emitting means is located to emit light to the left with an angle of approximately 45° with respect to the moving direction of said moving vehicle.

6. A position measuring apparatus of a moving vehicle in accordance with claim 3 wherein
   said first and second light emitting means are located to emit lights to the right and to the left, respectively, with asymmetric angles with respect to the moving direction of said moving vehicle.

7. A position measuring apparatus of a moving vehicle in accordance with claim 2 wherein
   said light emitting means comprises rotation scanning means for applying a light in a rotating manner from said moving vehicle toward the outside to make scanning,
   said position detecting means comprises angle detecting means for detecting a rotating angle of said rotation scanning means, data receiving means for receiving angle data from said angle detecting means in response to the detection output of said photodetecting means and calculating means for calculating a position of said moving vehicle based on a predetermined equation using as parameters the moving direction measured by said moving direction measuring means and the angle data received by said data receiving means.

8. A position measuring apparatus of a moving vehicle in accordance with claim 2 wherein said moving direction measuring means comprises
third light emitting means for emitting lights to the right and to the left perpendicularly to the moving direction of said moving vehicle, a third photodetector provided in association with said third light emitting means for detecting the light emitted from said third light emitting means and reflected from said first light reflecting means, a fourth photodetector provided in association with said third light emitting means for detecting the light emitted from said third light emitting means and reflected from said second light reflecting means, moving distance measuring means for direction measurement for measuring a moving distance of said moving vehicle specified in a period from the time when one of said third and fourth photodetectors detects said reflected light to the time when the other of said third and fourth photodetectors detects said reflected light and, angle calculating means for calculating the moving direction of said moving vehicle with respect to a predetermined reference direction based on the moving distance measured by said moving distance measuring means for direction measurement and the distance information between said first and second light reflecting means.

9. A position measuring apparatus of a moving vehicle in accordance with claim 1 wherein said moving direction measuring means is a gyroscope.

10. A position measuring apparatus of a moving vehicle in accordance with claim 1 wherein said moving direction measuring means is an azimuth magnet.

11. In an apparatus utilizing reflection of light for measuring the position of a moving vehicle along a predetermined course, the combination of:

light source means for providing first and second light beams at a point along said course, said light beams being positioned in a predetermined relationship to a predetermined reference direction of movement for said vehicle and intersecting said course from opposite lateral sides thereof, said vehicle having said first and second light beams impinge on opposite lateral sides thereof while moving along said course;

photodetecting means in said vehicle positioned to detect said first and second light beams when they impinge upon said vehicle, said photodetecting means producing first and second electrical signals indicating the detection of said first and second light beams respectively; and moving direction measuring means in said vehicle responsive to a delay between said first and second electrical signals for measuring the angle of deviation of the direction of movement of said moving vehicle with respect to said reference direction.

12. An apparatus in accordance with claim 11, further comprising position detecting means in said vehicle for detecting a position of said moving vehicle based on the angle of deviation measured by said moving direction measuring means and said first and second electrical signals of said photodetecting means.

* * * * *